Patented Aug. 13, 1940

2,211,489

UNITED STATES PATENT OFFICE 2,211,489

METHOD OF DECOLORIZING OIL

Ernest C. Bierce, Pasadena, Calif.

No Drawing. Application October 3, 1938,
Serial No. 233,131

2 Claims. (Cl. 196—147)

This invention relates to a method of decolorizing and refining oil and has special reference to a method of decolorizing and refining oil by percolation through treated alunite.

One important object of the invention is to provide a novel method of treating oil wherein a hitherto waste material is utilized as a decolorizing and refining agent through which to percolate oil for the purpose of removing undesirable color therefrom.

A second important object of the invention is to provide a novel method of decolorizing and refining oil by percolation through treated alunite wherein the oil, after percolation, will be left in a highly desirable clear and limpid state.

A third important object of the invention is to provide an improved method for decolorizing and refining oil wherein the material used for decolorizing and refining will be of such character as to prevent any addition of alkalinity to the treated oil.

With the above and other objects in view, as will presently be apparent, the invention consists in general of a certain novel method for treating oil hereinafter fully described and particularly pointed out in the appended claims.

In my co-pending application filed the 3rd day of October, 1938, Serial No. 233,132, I have fully described a method of preparing mineral alunite so that it may be used as a simple decolorizing and refining agent through which to percolate oil to remove undesirable color therefrom. In brief this method consists in crushing the alunite ore to a suitable size for the percolation of oil through a body of such crushed ore. This crushed ore is then calcined at such a temperature as to loosen the bonds between the aluminous content of the ore and the salt of sodium and potassium associated therewith in the alunite. While hot the calcined ore is introduced into a body of water with the result that the water becomes heated nearly to boiling point and this hot water affects solution of almost all the salts of sodium and potassium. The coarser solid matter is then separated from the solution and the finer matter. At this point the separated solids may be used simply by drying. However, there may remain some caustic potash and soda salts in this solid matter and these salts are not desirable in making the decolorizing and refining material.

It is therefore found advisable to treat the mixture of separated solids with a suitable acid in sufficient quantity to at least neutralize the alkalinity and preferably to slightly acidify the mass. Also the material is improved by adding a soluble chloride of one of the group comprising iron, zinc, aluminum, and magnesium together with a small quantity of a soluble silicate such as sodium silicate. The treatment is then continued by recalcination at a temperature to suit the particular oil to be decolored.

It is to be noted that the new material may be used in place of fuller's earth as a filler for oil percolation towers in which fuller's earth is customarily placed and through which gasoline or other like hydro-carbons are passed and refined. In fact the new material is possessed of great utility wherever activated alumina is used, as for example in the dehydrogenation of the lower paraffins over activated alumina, my new material replacing the activated alumina as commonly prepared and used.

The treated material is used in the same manner as any other decolorizing material in which the decolorization and refining is effected by percolation. That is to say, a bed of this material is formed and the oil to be treated is forced through this bed by gravity or otherwise as may be found desirable. The effect of thus percolating oil is to remove undesirable color together with any solid matter objectionable in the finished oil.

It will be observed that the alunite ore is very plentiful and cheap and that hitherto it has been used solely for the extraction of potassium and soda salts and the residue which I have found valuable for use in oil treatment, has been recorded as waste material.

What is claimed is:

1. That method of decolorizing and refining oil which consists in percolating the oil through a mass of calcined alunite substantially free from soluble salts of sodium and potassium.

2. That method of decolorizing and refining oil which consists in percolating the oil through a mass of calcined alunite substantially free from the soluble salts of sodium and potassium and having no alkaline reaction.

ERNEST C. BIERCE.